Nov. 9, 1943.  S. S. GREEN  2,333,647
MAGNETIC BEARING FOR METERS
Filed Nov. 8, 1940
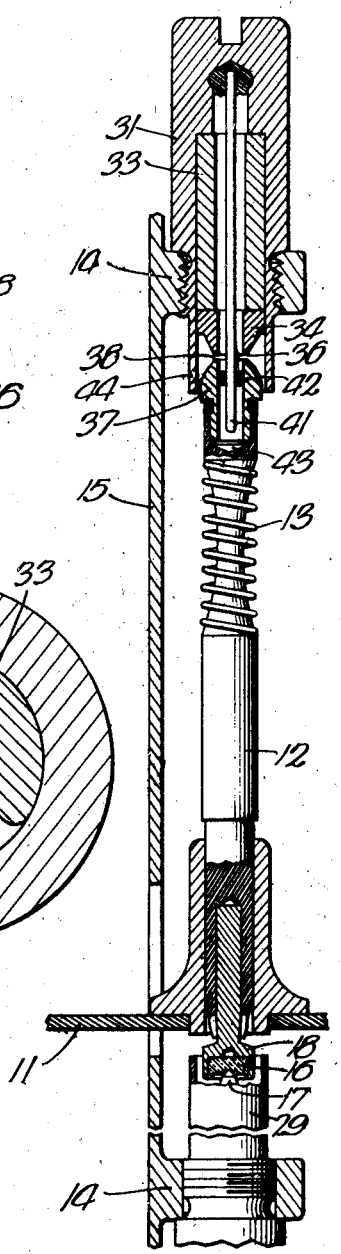
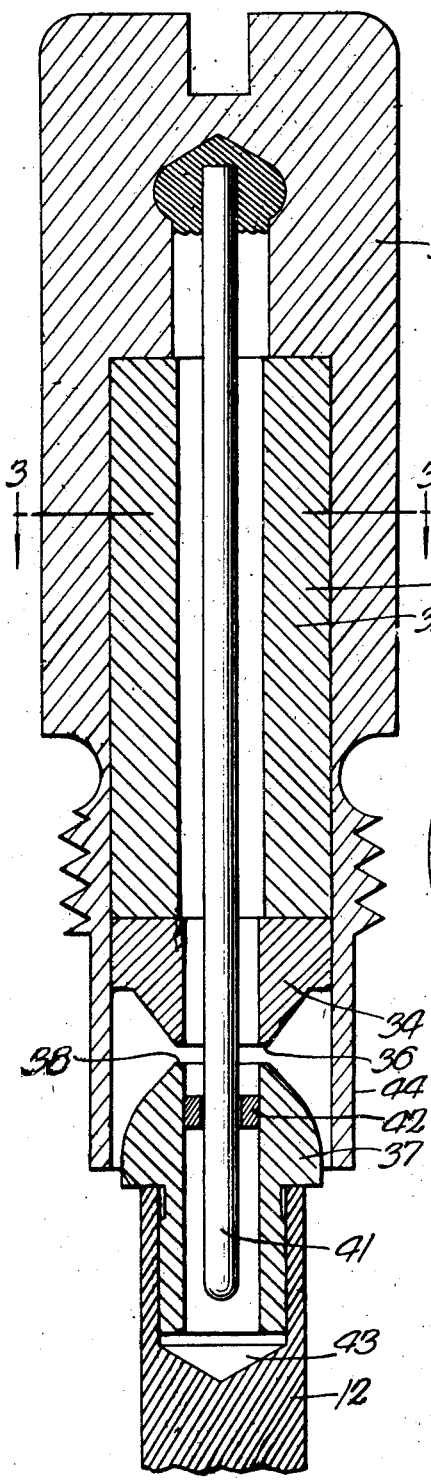
INVENTOR.
Stanley S. Green
BY Mann, Brown & Co
ATTYS.

Patented Nov. 9, 1943

2,333,647

UNITED STATES PATENT OFFICE 2,333,647

MAGNETIC BEARING FOR METERS

Stanley S. Green, La Fayette, Ind., assignor to Duncan Electric Manufacturing Company, La Fayette, Ind., a corporation of Illinois Application November 8, 1940, Serial No. 364,901

16 Claims. (Cl. 308—1)

Watt-hour meter discs rotate with very little friction, but in the course of a few years' service this slight amount of friction is enough to cause considerable damage to the bearings. The weight of the disc is usually borne by a cup-shaped jewel bearing at the bottom of the shaft, which bears on a pivot or ball. Deterioration of this lower bearing has been eliminated with very great satisfaction by inventions disclosed in my previous applications, and as a result the defects of the upper bearing have been emphasized by contrast.

The upper bearing is not supposed to bear any weight but only center the upper end of the shaft. Conventionally, it comprises a thin flexible bearing pin projecting from a rigid support downwardly into the rotating shaft and having a very slight clearance within a bearing bushing through which it extends. The minute clearance has been necessary in order to prevent chattering.

As an example of the minute clearances required, one manufacturer has made the diameter of the hole through the bushing only .0005 inch to .0015 inch larger than the diameter of the pin. With a clearance this small, a very small piece of foreign matter could wedge between the bushing and the pin and greatly increase the friction and wear. Furthermore, it was necessary to keep the axial length of the bearing bushing short to be sure that even without foreign matter there would be no binding between the pin and the bushing under various conditions. The result of the short bushing has been that in the case of meters operating under heavy load conditions there was considerable wear between the bushing and the pin. This wear was particularly noticeable because of the fact that the pin was made of small diameter to keep the friction torque arm as short as possible with the result that a relatively small volume of metal worn away would comprise a relatively large percentage of the cross section of the pin.

According to the present invention, a magnetic bearing is used which normally holds the upper end of the shaft approximately centered without any bearing contact. Hence, under starting and extremely light load conditions, where friction is most objectionable from the standpoint of accuracy of meter registration, there is zero friction at the upper bearing position. Furthermore, the magnet is so arranged that it partially supports the weight of the disc so that even the friction at the lower bearing is decreased.

Of course, under such light load conditions where there is no bearing contact, there will also be no wear. Under heavy duty conditions the torque exerted on the disc will probably pull the bearing surfaces into contact but the contact pressure will be considerably decreased by the pull of the magnets tending to center the shaft. Furthermore, the greater clearance between the pin and the bushing permitted by the provision of magnetic centering makes commercially practical the use of a longer bushing so that the wear may be spread over a sufficient area to substantially eliminate any deteriorating effects of the friction. At the same time the greater clearance tends to permit minute foreign particles to drop through the clearance to a point where they will do no harm instead of catching between the bushing and the pin.

By providing soft iron pole pieces having narrow annular pole faces facing each other and by using a bar-shaped magnet of high coercive metal of special cross section, a strong centering force is exerted on the shaft at very low cost.

By using a magnet metal having high coercive force and by using the efficient annular pole faces just mentioned, it has been found possible to apply the magnetic bearing to present conventional meters, the magnet and its adjacent pole member being small enough to be contained within a bearing holder of the same outside dimensions as that now used. This is an important advantage from the standpoint of interchangeability between the old bearings and the new. Such interchangeability is a feature which is very desirable commercially.

Additional advantages and objects of the invention will be apparent from the following description and from the drawing, in which:

Fig. 1 is a fragmentary view showing the mounting of a meter shaft embodying this invention.

Fig. 2 is an enlarged detail view corresponding to the upper portion of Fig. 1.

Fig. 3 is a horizontal cross section taken approximately on the line 3—3 of Fig. 2.

Fig. 4 is a diagrammatic representation of the two pole faces slightly out of alinement.

A preferred form of the invention has been chosen for illustration and description, in compliance with section 4888 of the Revised Statutes, but persons skilled in the art will readily perceive other means for accomplishing the same results, and the claims are therefore to be construed as broadly as possible, consistent with the prior art.

A meter disc 11 is carried by a shaft 12 with which it rotates. The shaft 12 carries a worm gear 13 which drives a meter register to register the amount of energy consumed. The shaft 12 is supported by brackets 14 which are integral portions of the main meter frame 15. The main meter frame including the brackets 14 may be conventional and, in fact, one of the advantages of the present invention is that it is designed to be used with frames identical to those in use heretofore.

The lower bearing is fully described in a copending application, Serial No. 330,561, the disclosure of which is hereby made a part hereof. Briefly stated, the lower bearing includes an inverted cup-shaped jewel 16 resting on a pivot 17, preferably formed of a non-corrosive alloy as disclosed in my Patent No. 2,203,411, issued June 4, 1940. The jewel 16 is mounted in a jewel holder 18 which is removably carried by the shaft 12. The pivot 17 is preferably spring-mounted but normally rigidly positioned by a bearing holder 29 threaded into the lower bracket 14.

The upper bearing is carried by an upper bearing holder 31 which threads into the upper bracket 14. It may be noted that both bearing holders 29 and 31 are screwed home so that, if removed, they will be returned to the same position with exactly the same spacing between them. They are made with sufficient uniformity to permit replacement of an old one by a new one, although with the present invention replacement will rarely, if ever, be necessary. The bearing holder 31 may be exactly the same externally as bearing holders heretofore in regular use by one of the meter manufacturers, so that the new parts may be interchangeable with the old.

Magnetic bearing

According to the present invention, a permanent magnet 33 is secured in the bearing holder 31. A soft iron pole portion 34 is also secured within the holder 31, preferably being in contact with the lower end of the permanent magnet 33. The pole portion 34 may be secured in any convenient manner, as by having a pressed fit with the holder 31 which is non-magnetic. The pole portion 34 is tapered downwardly to a very narrow annular pole face 36.

A soft iron plug 37 has a pressed fit with the upper end of shaft 12 and is likewise tapered upwardly to a pole face 38 which is homologous with the pole face 36. In other words, it has the same internal and external diameters as the pole face 36.

When the two faces 36 and 38 are in accurate alinement, they form a short gap therebetween and there is no resultant magnetic force exerted laterally on the plug 37. The entire force is exerted vertically and tends to lighten the apparent weight of the shaft 12 and disc 11. This is advantageous because it decreases the friction between the jewel 16 and the pivot 17 so that the meter starts on a lower consumption of current. If, as diagrammatically indicated in Fig. 4, the upper end of shaft 12 is displaced laterally only the width of one side of the pole face, a strong centering pull will be exerted between the two pole faces. This is due to the fact that this small movement completely displaces the majority of the pole faces from one another. If the same area of pole faces were arranged in the form of a solid circle instead of an annular ring, the relative displacement from the same given length of movement would not be nearly as great. As a matter of fact, it is not necessary for the two pole faces to be as much out of alinement as shown in Fig. 4 for the pull between them to be substantial, and therefore the upper end of the shaft 12 will normally be centered quite accurately by the magnetic force.

Supplemental bearing

Although the upper end of shaft 12 will normally be centered by magnetic force, a heavy electrical load on the meter will exert forces on the disc and shaft assembly which will be strong enough so that they could pull the shaft 12 more out of alinement than is desirable if such pull was resisted only by the magnetic forces between the pole faces 36 and 38. For this reason a supplemental bearing is provided, this bearing comprising a flexible pin 41 and a bushing 42. The flexible pin 41 may be identical with the flexible pins heretofore used for like purposes without the magnets. Thus, it may be made of "K Monel" metal, a non-magnetic metal, and it may be soldered to the bearing holder at its upper end, as described in my prior Patent No. 2,167,649, issued August 1, 1939.

The bearing ring or bushing 42 is preferably formed of bronze as is conventional but it is preferably far from conventional in dimensions. Instead of having a diameter approximately .001 inch larger than the diameter of the pin, its diameter is preferably from .004 inch to .008 inch larger than the pin, so that there is, in other words, a clearance between the pin and the bushing of approximately .004 inch to .008 inch.

This large clearance would be unsatisfactory without the magnetic centering, chiefly because it would cause chattering. Such chattering might be caused either by rotation of the disc or by the strong alternating magnetic flux emanating from the potential coil, in which latter case the disc might be standing still.

With the large clearance of this invention, minute foreign particles will usually fall through the clearance between the pin 41 and the bushing 42 into the space 43 where such particles will be harmless. Heretofore they have tended to catch in the minute clearance between the pin and the bushing with the result that friction and wear were greatly increased. Also, because of the greater clearance between the pin and bushing, it is now practical commercially to make the bearing surface larger by making the bearing ring 42 longer in an axial direction. Heretofore the axial length of the bearing surface has been from approximately .016 inch to .020 inch or sometimes even as high as .040 inch. Bearings even as long as .040 inch were commercially troublesome, because the longer they were the more likely they were to bind on the pin because of the close tolerances, aggravated by the changing angularity between the pin and the bushing as the shaft was moved by the meter torque from its normal position. With the larger clearances of the present invention the bearing length may easily be .040 inch as a minimum, and a size of .060 inch would not be troublesome. With a size in this range there will be no appreciable wear on the bearing pin 41. As a matter of fact, either the magnetic centering effect of this invention or the elongated bearing surface would usually be enough to prevent excessive wear on the pin 41. The two of them together cooperate to approximately eliminate wear even under severe service conditions. The magnetic centering effect not only maintains the parts centered and out of contact during light load operations, but greatly reduces the total contact pressure even when there is a heavy load. Since the total contact pressure is distributed somewhat over the length of the bearing surface, the unit pressure is still further reduced by lengthening the bearing.

The permanent magnet 33 is preferably formed of one of the highly coercive and relatively inexpensive metals now available. Such metals are generally known as "Alnico." There are several varieties of "Alnico," any of which may be used, but the standard and cheapest variety is satisfactory. This has a composition approximately as follows: Nickel 20%, aluminum 12%, cobalt 5%, and iron 63%. The compositions of other "Alnico" alloys are stated in my copending application Serial No. 351,285, and are hereby made a part of the present disclosure by reference.

A magnet of high coercive metal is desirable because of the desirability of getting the magnet in the small space available within the holder 31. A magnet of the size shown has, surprisingly, been found to have sufficient strength to support from one-third to at least two-thirds the weight of the disc, depending on the length of the gap between the faces 36 and 38. It is preferred not to support the entire weight of the disc because to do so would necessitate providing an upper thrust bearing and a bearing at the lower end of the shaft which would center the shaft without the aid of gravity. The magnet should be weak enough so that even if, during shipping, the disc shifts to cause contact between the pole faces 36 and 38, the disc will drop away. Non-magnetic spacing means, such as a shim on top of pole face 38, may be provided if desired, to prevent contact between the pole faces. In that case the total gap would be somewhat longer and hence the magnet should be somewhat stronger.

One advantage of "Alnico" is that it is cast to form the magnets and hence the magnets may easily be formed to special shapes. According to the present invention, the "Alnico" is formed in bars having the U-shape in cross section shown in Fig. 3. This provides a passage for the reception of the pin 41 without the necessity for drilling a hole through the magnet or providing a central core. Long bars may be formed with different cross section and cut to form the individual magnets. Only the lower face of the magnet need be ground flat. Of course, the upper face of the pole portion 34 and both of the faces 36 and 38 should also be ground flat. Sintered magnets might be used, in which case a tubular shape might be formed as easily as the U-shape illustrated.

Except for the portions mentioned as being magnetic, it is preferred that all of the other parts be non-magnetic. It is particularly important that the skirt portion 44 of the bearing holder 31 be non-magnetic since otherwise its attraction for the plug 37 would nullify the centering tendencies of the faces 36 and 38. The bearing holder 31 is conventionally formed of brass.

Although, for the most part, the invention may depart widely from the dimensions illustrated, it may be some help to those using the invention to note that the drawing is approximately to scale and that the length of the pin 41, as illustrated, is .887 inch. The flat pole faces 36 and 38 have an outside diameter of about .075 inch and a radial width of approximately .005 inch, the scale here being somewhat inexact. It is at present preferred that these dimensions be no greater than those stated.

Although the permanent magnet is quite short, it has adequate strength because of the fact that it is formed of a metal which has a coercive strength in excess of 400 oersteds. By coercive strength is meant the de-magnetizing force necessary to completely overcome the residual magnetism if the metal had been fully magnetized. Of course, less highly coercive metals, such as the cobalt steels, could be used, at least if the magnet were somewhat elongated, the bearing holder being somewhat lengthened to receive it. A magnetic metal having a coercive strength of 400 oersteds or higher permits a short enough magnet to use bearing holders of conventional external dimensions.

Although both pole faces 36 and 38 have been shown as complete rings, it is evident that one of them could be notched without causing any irregularity in the movement of the disc. Conceivably, there might even be some advantage in notching the upper pole face 36 to provide a plurality of separated pole-face portions, so long as they were annularly disposed, i. e. located generally uniformly along a circular line normally opposite the lower pole face 38. It is possible that this would result in retaining a relatively uniform distribution of flux through the various pole faces as the shaft tilted and therefore produce a stronger centering effect.

It will be observed that the pole face has an outside diameter of about .075 inch and is over 1.6 inch from the tilting center of the shaft or the top of pivot 17 of the lower bearing. Therefore, the extreme outside portion of the pole face has negligible upward movement as it moves toward the axis when the shaft is deflected. The result of this is that there is substantially no component of movement of any part of face 38 toward face 36. If the faces were, say, two inches in diameter, the tilting of the lower face about the pivot would cause one side of the face to move upwardly toward the pole piece 34; possibly being drawn toward it so that the magnetic centering effect would be greatly weakened or even destroyed. This necessity for confining the pole faces to a small angle with respect to the pivotal point has not heretofore been appreciated and it is believed that, even if the pole face were considerably larger than shown and extended through an angle of 15° about pivot 17, this would be a substantial improvement over the structures heretofore suggested but probably never successfully constructed. As illustrated, it extends through only about 3°, or the outer edge of the pole face is displaced only about 1½° from the vertical line through the center of pivot 17. It will also be noted that the clearance of .008 inch or less between bushing 42 and pin 41 is not enough to let the pole face 38 be displaced far enough from face 36 to cause a decrease of the centering force. This is at present believed to be important to the proper functioning of the bearing.

I claim:

1. In a watt-hour meter, a disc, a shaft carrying the disc, a bearing below the shaft supporting part of the weight of the shaft and laterally restraining the lower end of the shaft, and a bearing for laterally restraining the upper end of the shaft comprising a pin extending through a ring and having a substantial clearance therewithin, and two magnetic units, one rigidly secured and the other carried by the shaft, one having a narrow annular pole face facing axially, and the other having narrow annularly disposed pole face means directly opposed thereto and magnetically attracted theretoward to sustain part of the weight of the disc and shaft and normally maintaining the ring out of contact with the pin, said disc being positioned adjacent the lower bearing and remote from the pole faces.

2. In a watt-hour meter, a disc, a shaft carrying the disc, a bearing below the shaft supporting part of the weight of the shaft and laterally restraining the lower end of the shaft, and a bearing for laterally restraining the upper end of the shaft comprising a pin extending through a ring and having a substantial clearance therewithin, and two magnetic units, one rigidly secured and the other carried by the shaft, one having a narrow annular pole face facing axially, and the other having narrow annularly disposed pole face means directly opposed thereto and magnetically attracted theretoward to sustain part of the weight of the disc and shaft and normally maintaining the ring out of contact with the pin.

3. In a watt-hour meter, a disc, a shaft carrying the disc, a bearing below the shaft supporting part of the weight of the shaft and laterally restraining the lower end of the shaft, and a bearing for laterally restraining the upper end of the shaft comprising a pin extending through a ring and having a substantial clearance therewithin, and two magnetic units, one rigidly secured and the other carried by the shaft, one having a narrow annular pole face facing axially, and the other having narrow annularly disposed pole face means directly opposed thereto and magnetically attracted theretoward to sustain part of the weight of the disc and shaft and tending to maintain the shaft centered on a predetermined axis independently of the pin.

4. Bearing means for the upper end of a vertical shaft for centering the shaft normally without contact therewith, comprising a magnetic unit including a permanent magnet and having a pole face, and a second magnetic unit having a pole face, one of said units being secured to the shaft and the other being stationarily mounted to form a narrow gap therewith, the faces being formed so that the gap extends along and is approximately confined to a circular line, and the faces being disposed axially with respect to one another and directly opposed to one another whereby the permanent magnet will have a centering action and a weight-supporting action on the shaft, the other pole of the permanent magnet being magnetically remote from the shaft.

5. Bearing means for the upper end of a vertical shaft for centering the shaft normally without contact therewith, comprising a magnetic unit including a permanent magnet and having a pole face, and a second magnetic unit having a pole face, one of said units being secured to the shaft and the other being stationarily mounted to form a narrow gap therewith, the faces being formed so that the gap extends along and is approximately confined to a circular line, and the faces being disposed axially with respect to one another and directly opposed to one another whereby the permanent magnet will have a centering action and a weight-supporting action on the shaft, the other pole of the permanent magnet being magnetically remote from the shaft, and the permanent magnet being formed as a straight bar.

6. Bearing means for the upper end of a vertical shaft for centering the shaft normally without contact therewith, comprising a magnetic unit including a permanent magnet and having a pole face, and a second magnetic unit having a pole face, one of said units being secured to the shaft and the other being stationarily mounted to form a narrow gap therewith, the faces being formed so that the gap extends along and is approximately confined to a circular line, and the faces being disposed axially with respect to one another and directly opposed to one another whereby the permanent magnet will have a centering action and a weight-supporting action on the shaft, the other pole of the permanent magnet being magnetically remote from the shaft, and additional bearing means comprising a flexible pin extending through a ring, one carried by the shaft and the other stationarily mounted, the pin being substantially smaller in diameter than the hole through the ring and being normally out of contact therewith.

7. Bearing means for the upper end of a vertical shaft for centering the shaft normally without contact therewith, comprising a magnetic unit including a permanent magnet and having a pole face, and a second magnetic unit having a pole face, one of said units being secured to the shaft and the other being stationarily mounted to form a narrow gap therewith, the faces being formed so that the gap extends along and is approximately confined to a circular line, and the faces being disposed axially with respect to one another and directly opposed to one another whereby the permanent magnet will have a centering action and a weight-supporting action on the shaft, the other pole of the permanent magnet being magnetically remote from the shaft, and additional bearing means comprising a flexible pin extending through a ring, one carried by the shaft and the other stationarily mounted, the pin being .002 inch smaller in diameter than the hole through the ring and being normally out of contact therewith.

8. Bearing means for the upper end of a vertical shaft for centering the shaft normally without contact therewith, comprising a magnetic unit including a permanent magnet and having a pole face, and a second magnetic unit having a pole face, one of said units being secured to the shaft and the other being stationarily mounted to form a narrow gap therewith, the faces being formed so that the gap extends along and is approximately confined to a circular line, and the faces being disposed axially with respect to one another and directly opposed to one another whereby the permanent magnet will have a centering action and a weight-supporting action on the shaft, and all opposed pole faces being within an angle of 15° about the tilting center of the shaft.

9. In a meter, a rotating moving element subject to tilting forces under heavy load conditions, a cup-shaped bearing member for centering the lower end of the moving element under the influence of part of the weight thereof, and means for centering the upper end of the moving element including a bar magnet which exerts a centering magnetic force on the moving element and a lifting magnetic force on the moving element to reduce the friction on said bearing member, and additional bearing means comprising a ring and a pin extending thereinto with one carried by the moving element and the other stationarily positioned, said magnet normally holding the moving element with the ring and pin out of contact with one another, but the clearance being small enough to cause engagement under heavy load conditions while the moving element is still in a satisfactory operating position.

10. Bearing means for the upper end of a vertical shaft for centering the shaft normally without contact therewith, comprising a magnetic unit including a permanent magnet and having a pole face, and a second magnetic unit having a pole face, one of said units being secured to the shaft and the other being stationarily mounted to form a narrow gap therewith, the faces being formed so that the gap extends along and is approximately confined to a circular line, and the faces being disposed axially with respect to one another and directly opposed to one another whereby the permanent magnet will have a centering action and a weight-supporting action on the shaft, and all opposed pole faces being within an angle of approximately 3° about the tilting center of the shaft.

11. Bearing means for the upper end of a vertical shaft for centering the shaft normally without contact therewith, comprising a magnetic unit including a permanent magnet and having a pole face, and a second magnetic unit having a pole face, one of said units being secured to the shaft and the other being stationarily mounted to form a narrow gap therewith, the faces being formed so that the gap extends along and is approximately confined to a circular line, and the faces being disposed axially with respect to one another and directly opposed to one another whereby the permanent magnet will have a centering action and a weight-supporting action on the shaft, and all opposed pole faces being within an angle about the tilting center of the shaft so small that the point on the periphery of the pole face carried by the shaft, which upon tilting of the shaft in a given direction moves in a radial plane toward the normal axis of the shaft, has substantially no component of movement toward the adjacent portion of the opposed pole face of the stationarily mounted magnetic unit.

12. Magnetic bearing means adapted to fit watt-hour meters identical with those in use heretofore, including a holder threaded to fit the upper bearing bracket on such meters and having substantially the same external dimensions as bearing holders on said meters heretofore, a magnetic unit including a permanent magnet of relatively high coercive strength located within the confines of said holder and spaced substantially from the lower end thereof and provided with downwardly-facing annular pole face means, and an insert adapted to fit the upper end of a shaft of such meter and provided with an upwardly-facing annular magnetic pole face of approximately the same diameter as the pole face of said magnetic unit, said insert being of such dimensions that when properly positioned in said shaft it will project into said holder and leave a small gap between said faces.

13. Magnetic bearing means adapted to fit watt-hour meters identical with those in use heretofore, including a holder threaded to fit the upper bearing bracket on such meters and having substantially the same external dimensions as bearing holders on said meters heretofore, a magnetic unit including a permanent magnet of relatively high coercive strength located within the confines of said holder and spaced substantially from the lower end thereof and provided with downwardly-facing annular pole face means, an insert adapted to fit the upper end of a shaft of such meter and provided with an upwardly-facing annular magnetic pole face of approximately the same diameter as the pole face of said magnetic unit and having an internal cylindrical bearing surface, said insert being of such dimensions that when properly positioned in said shaft it will project into said holder and leave a small gap between said faces, and a pin rigidly secured at its upper end to said holder, extending down through said magnetic unit and adapted to extend through said bearing surface without touching the same.

14. Magnetic bearing means adapted to fit watt-hour meters identical with those in use heretofore, including a holder threaded to fit the upper bearing bracket on such meters and having substantially the same external dimensions as bearing holders on said meters heretofore, a magnetic unit including a permanent magnet of relatively high coercive strength located within the confines of said holder and spaced substantially from the lower end thereof and provided with downwardly-facing annular pole face means, an insert adapted to fit the upper end of a shaft of such meter and provided with an upwardly-facing annular magnetic pole face of approximately the same diameter as the pole face of said magnetic unit and having an internal cylindrical bearing surface, said insert being of such dimensions that when properly positioned in said shaft it will project into said holder and leave a small gap between said faces, and a pin rigidly secured at its upper end to said holder, extending down through said magnetic unit and adapted to extend through said bearing surface without touching the same, said permanent magnet being cast in approximately U-shape in horizontal cross section to form an opening for said pin without coring.

15. Bearing means for the upper end of a vertical shaft for centering the shaft normally without contact therewith, comprising a magnetic unit including a permanent magnet and having a pole face, and a second magnetic unit having a pole face, one of said units being secured to the shaft and the other being stationarily mounted to form a narrow gap therewith, the faces being formed so that the gap extends along and is approximately confined to a circular line, and the faces being disposed axially with respect to one another and directly opposed to one another whereby the permanent magnet will have a centering action and a weight-supporting action on the shaft, and all opposed pole faces being within an angle about the tilting center of the shaft as small as approximately 3° so that the point on the periphery of the pole face carried by the shaft, which upon tilting of the shaft in a given direction moves in a radial plane toward the normal axis of the shaft, has substantially no component of movement toward the adjacent portion of the opposed pole face of the stationarily mounted magnetic unit.

16. Bearing means for the upper end of a vertical shaft for centering the shaft normally without contact therewith, comprising a magnetic unit including a permanent magnet and having a pole face positioned above the shaft, a second magnetic unit having a pole face and secured to the shaft as an insert in the upper end thereof forming a narrow gap with the first magnetic unit, the faces being formed so that the gap extends along and is approximately confined to a circular line, and the faces being disposed axially with respect to one another and directly opposed to one another whereby the permanent magnet will have a centering action and a weight-supporting action on the shaft, and all opposed pole faces being within an angle about the tilting center of the shaft as small as approximately 3° so that the point on the periphery of the pole face carried by the shaft, which upon tilting of the shaft in a given direction moves in a radial plane toward the normal axis of the shaft, has substantially no component of movement toward the adjacent portion of the opposed pole face of the stationarily mounted magnetic unit, said vertical shaft being formed of a non-magnetic material substantially lighter than iron.

STANLEY S. GREEN.